July 29, 1941.  W. J. CRITES ET AL  2,250,703
APPARATUS FOR LOCATING CASING SEATS
Filed Nov. 18, 1938
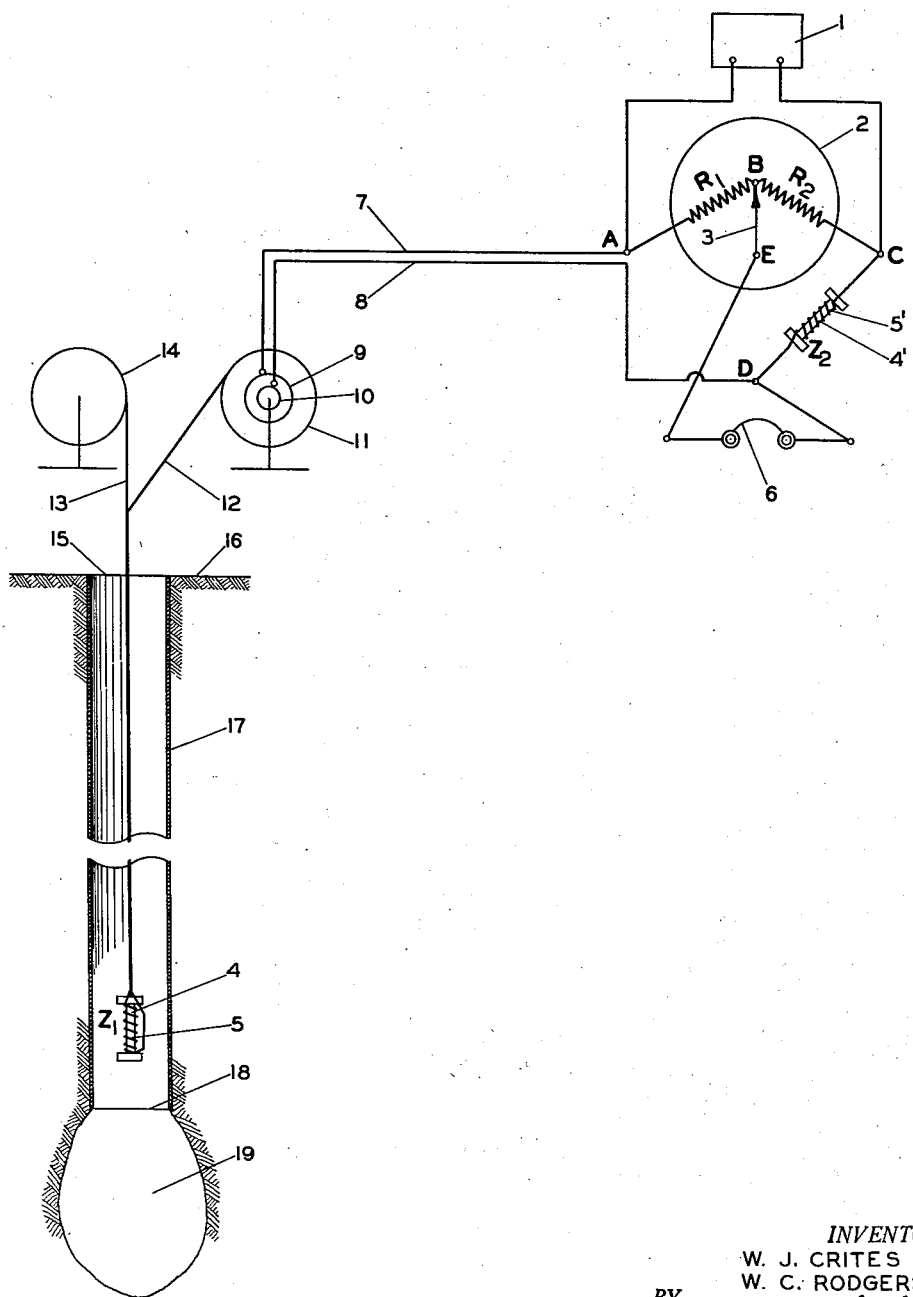
INVENTOR.
W. J. CRITES
W. C. RODGERS
BY *Hudson, Young, Shawley & Yinger*
ATTORNEYS.

Patented July 29, 1941

2,250,703

UNITED STATES PATENT OFFICE 2,250,703

APPARATUS FOR LOCATING CASING SEATS

Wilbur J. Crites and William C. Rodgers, Bartlesville, Okla., assignors to Phillips Petroleum Company, a corporation of Delaware Application November 18, 1938, Serial No. 241,270

2 Claims. (Cl. 175—182)

This invention relates to apparatus for determining and locating areas whose magnetic permeability differs from that of the normally surrounding medium. More particularly, this invention concerns apparatus for electrically locating casing seats in wells; ascertaining the exact point of parting or other defects in a string of well casing; and identifying any casing collapse in wells. Additionally, the practice of this invention permits ready determination of the position of paramagnetic objects, such as drill bits, bailers, pumps and the like, in open holes. As is often the case, these articles become side-tracked in an open hole; and, through the use of our invention, their exact position in the hole may be quickly and accurately ascertained.

Our invention utilizes the electrical phenomenon of self induction in a coil, which is wound around an iron core and placed in a balanced or unbalanced closed electric circuit, to signal the instant the coil passes from the paramagnetic to a diamagnetic region or vice versa. A current, passing through a coil of wire wound around an iron core, creates magnetic flux, the amount of flux formed being dependent upon the number of turns in the coil, the material and design of the core, and the magnitude of the current. Also, the flux will be greater if the core forms a completely closed circuit than if there is a break such as an air gap in the core circuit. Any change in an electric circuit that tends to alter the amount of flux produced by the coil will, by self induction, set up a current in the coil that opposes the change. Thus, if the flux is increased, the induced current will oppose the increase; and, correspondingly, if the flux is decreased, the induced current will oppose the decrease. When an alternating current is passed through a coil, the flux thereby created changes periodically and an induced electromotive force and current are present at all times, acting as an impedance that retards the normal flow of current.

Our invention teaches the utilization of the above discussed electrical principles in conjunction with a closed electric circuit to identify, among other things, the location of casing seats. We find that an electric circuit which is basically of the Wheatstone bridge type is eminently satisfactory for the purposes indicated. The advantages of this circuit, together with a detailed description of its construction and mode of operation, will be presented further along in this specification.

The primary object of this invention is to provide electrical apparatus for use in cased or open well holes for the accurate determination and location of areas of changing magnetic permeability. Specific applications of this invention include the locating of casing seats in cased well holes and determining the position of bits, drills, bailers, and the like in open well holes.

Another object of this invention is to provide electrical apparatus of the type designated, which apparatus is efficient and positive in operation. Furthermore, this apparatus is rugged in construction, reasonable in first cost, and inexpensive to operate and maintain.

These and other objects and advantages will be apparent from the following specification and annexed drawing which describe and illustrate a preferred embodiment of the invention.

The drawing is a diagrammatic representation of our invention partly in cross section.

Referring to the drawing, a Wheatstone bridge circuit is illustrated therein, consisting of the four branches AB, BC, CD and DA. A suitable source of high frequency alternating current supply $I$ is connected across the bridge circuit at A and C. This source of alternating current supply may, for example, consist of a battery operated audio frequency oscillator when our invention is practiced in regions remote from an electric power line. Intermediate points A and C, in the upper part of the bridge circuit, is a potentiometer 2, having a sliding contact 3. With the sliding contact 3 at position B in the drawing, the variable resistance of the potentiometer is divided into two parts with respect to the sliding contact, namely, $R_1$ and $R_2$. Likewise, intermediate points A and C in the lower portion of the bridge circuit are a movable or traveling impedance coil $Z_1$ and a balancing impedance coil $Z_2$, each respectively consisting of iron cores 4 and 4' about which are windings 5 and 5'. A pair of headphones 6 is connected across points B and D of the bridge circuit by means of conventional electrical connections at D and E. The headphones are recommended in the practice of our invention as they afford a simple and effective means for audibly signaling to the operator the instant the traveling coil has arrived at an area of changing magnetic permeability. However, it should be clearly understood that instead of employing audible means, we may substitute various other types of signaling or indicating means.

With reference to branch DA of the bridge circuit, it is observed that wires 7 and 8 are connected to slip rings 9 and 10, respectively, which are mounted on a conductor cable reel 11. Slip rings 9 and 10 are in turn electrically connected to the upper end of a two conductor cable 12 which is attached at its lower end to the winding on traveling coil $Z_1$. By properly insulating cable 12, changes in self induction and capacity, which would ordinarily occur in this cable during the process of raising and lowering traveling coil $Z_1$, are practically eliminated. A measuring line 13, properly graduated to indicate the position of coil $Z_1$ is fastened at its upper end to reel 14 and at its lower end to the traveling coil. Cable 12 and measuring line 13 are clipped together at regular intervals while the traveling coil is being lowered into well bore 15 in order to prevent the cable from becoming entangled with the coil or any obstructions which may be present in the bore. Instead of providing a separate conductor cable and measuring line, we can provide suitable graduations on the conductor cable. We can thus omit measuring line 13 and reel 14, and utilize reel 11 alone to both energize the traveling coil and measure its location in the well bore. This simplified arrangement results in appreciable economies and increased speed of operation despite the higher initial cost of a properly graduated conductor cable as compared to the cost of the separate measuring line and conductor cable shown in the drawing.

In the illustrated embodiment of our invention, reference numeral 16 denotes the level of the ground surrounding well bore 15 in which a string of well casing 17 has been set in place. The lower end or seat 18 of the string of casing communicates with open hole portion 19 of the well bore.

There are two preferred modes of procedure for the operation of the above described invention. While they are basically the same, each is, for the sake of clarity, briefly discussed herein. In the practice of our first mode of procedure, the operator places the source of electric supply 1 in service and adjusts the headphones 6 over his ears. The bridge circuit is then balanced with both the traveling coil $Z_1$ and balancing coil $Z_2$ outside the well bore and removed from the immediate neighborhood of any paramagnetic objects. The balancing of the circuit is accomplished by moving sliding contact 3 along the potentiometer resistance until, at some point such as B, no sound is heard through the headphones. With the bridge circuit properly balanced, conductor cable reel 11 and measuring line reel 14 are revolved in unison and the traveling coil is lowered into the string of casing 17. As soon as the traveling coil is introduced into the string of casing, it will be influenced by the paramagnetic material of the casing, namely, steel in this case, and a self induced current will be set up in this coil. This self induced current tends to oppose the normal current acting on the circuit and creates an unbalanced condition in the circuit. As a result of the circuit becoming unbalanced, current will flow across points BD in the circuit and an audible sound is produced in the headphones. The sound will continue to be heard by the operator while the traveling coil is being lowered into the casing. Should there be a break in the string of casing, the self induced current will change when the coil reaches that particular region. The operator will be apprised of this condition by the corresponding change in the sound heard over the headphones. By noting the length of measuring line which has been lowered into the casing, the operator can readily ascertain the depth at which the break in the casing has occurred. In the same manner, the operator may continue to lower the traveling coil until the casing seat 18 is located. As soon as the coil passes below this point, there will no longer be a self induced current in the circuit, due to the lowering of the traveling coil beyond the region of influence of the former surrounding paramagnetic material. The bridge circuit becomes balanced again and no sound is heard over the headphones. The depth of the casing seat is determined by simply referring to the graduated measuring line.

The other preferred mode of procedure contemplates balancing the bridge circuit while the traveling coil is in the casing. There will be no signal or sound received through the headphones in this case so long as the traveling coil is in the casing. When the coil is lowered to a diamagnetic region, such as at a break in the casing or just below the casing seat, the bridge circuit becomes unbalanced and a sound is transmitted over the headphones to the operator. The other steps are the same as those outlined under the first described mode of procedure.

As was stated above, this invention may be utilized to determine the location of paramagnetic objects, including drill bits, pumps and bailers, in an open well bore. Let us assume that a drill bit has been lost in an open well bore. To discover its location, we first balance the bridge circuit with the traveling coil in the well bore. This coil and attached measuring line are next lowered into the bore until a sound is received over the headphones by the operator. The reading on the measuring line at the time of maximum sound indicates to the operator the depth of the drill bit below the surface of the ground. The drill bit can then be recovered through the use of suitable "fishing" tools.

It is to be understood that the form of this invention, herewith shown and described, is to be taken as a preferred example of the same and that various changes in size, shape and arrangement of parts may be resorted to without departing from the spirit of this invention, and further that the theories of operation set out, although believed to be accurate, are not to be considered as the sole basis of the operativeness of this device, but that this device does operate successfully whether or not upon the principles described herein, this invention to be limited only by the appended claims.

We claim:

1. Apparatus for electrically exploring a well bore, comprising an electro-magnetic device, a source of electrical potential connected across the device, means for moving the device through the well bore, means for indicating the instant the device is moved to the juncture of regions of different magnetic permeability in the well bore, and a measuring line connected to the device for ascertaining the depth of the device in the well bore.

2. Apparatus for electrically exploring a well bore, comprising an electro-magnetic device, a source of electrical potential connected across the device, means for moving the device through the well bore, said means comprising a reel and a plurality of electrical conductors, each of said conductors being connected at one end to the reel and at its opposite end to the device, means for indicating the instant the device is moved to the juncture of regions of different magnetic permeability in the well bore, and a measuring line connected to the device for ascertaining the depth of the device in the well bore.

WILBUR J. CRITES.
WILLIAM C. RODGERS.